United States Patent [19]
Hirose et al.

[11] Patent Number: 4,782,225
[45] Date of Patent: Nov. 1, 1988

[54] SHEET-PROCESSING APPARATUS INCLUDING OPTICAL SENSOR CLEANING DEVICE

[75] Inventors: Minoru Hirose, Chigasaki; Hideo Okuyama, Yokohama; Junichiro Hara, Tokyo; Hajime Watanabe, Yokohama, all of Japan

[73] Assignee: Kabushiki Kaisha Toshiba, Kawasaki, Japan

[21] Appl. No.: 29,771

[22] Filed: Mar. 24, 1987

[30] Foreign Application Priority Data

Mar. 25, 1986 [JP] Japan .................. 61-66298
Mar. 25, 1986 [JP] Japan .................. 61-66299

[51] Int. Cl.⁴ .................................. G01N 9/04
[52] U.S. Cl. .................. 250/223 R; 250/239
[58] Field of Search ............ 250/223 R, 574, 575, 250/239; 350/582, 583

[56] References Cited

U.S. PATENT DOCUMENTS

| | | | |
|---|---|---|---|
| 3,805,027 | 4/1974 | Azure | 350/382 |
| 3,844,661 | 10/1974 | Birkett | 350/382 |
| 4,165,179 | 8/1979 | Sato | 350/382 |
| 4,363,545 | 12/1982 | Schafer | 350/382 |
| 4,434,359 | 2/1984 | Watanabe | 235/379 |
| 4,473,279 | 9/1984 | Sakaki | 350/382 |
| 4,536,064 | 8/1985 | Schindel | 350/382 |
| 4,670,647 | 7/1987 | Hubble | 250/223 R |
| 4,701,959 | 10/1987 | Asai | 350/382 |

FOREIGN PATENT DOCUMENTS 53-24776 6/1978 Japan.

Primary Examiner—David C. Nelms
Assistant Examiner—Jessie Ruoff
Attorney, Agent, or Firm—Cushman, Darby & Cushman

[57] ABSTRACT

A sheet processing apparatus comprises conveyor belts for conveying a plurality of supplied sheets one by one and optical detecting units for optically detecting sheets conveyed in the convey belts, and performs predetermined processing while the sheets are being conveyed by the conveyor belts. The apparatus further comprises cleaning pads, provided in the apparatus, for cleaning the optical detecting units and cleaning actuating units, provided in the apparatus, for actuating the cleaning pads to clean the optical detecting units.

5 Claims, 6 Drawing Sheets

SHEET-PROCESSING APPARATUS INCLUDING OPTICAL SENSOR CLEANING DEVICE

BACKGROUND OF THE INVENTION

The present invention relates to a sheet-processing apparatus, which comprises a convey means for conveying a plurality of supplied sheets one by one and an optical detecting means for optically detecting the sheets conveyed by the convey means, and which processes, in a predetermined way, the sheets being conveyed by the convey means.

An apparatus for sorting bank notes is well known as one type of the sheet-processing apparatus described above. In a note-sorting apparatus, when a bundle of notes of different is supplied to the inlet of a convey means, the convey means takes in the notes from the bundle one by one, and conveys the bank notes one by one. A device for discriminating paper bills is provided at a midway portion along the convey path of the convey means. A portion of the convey path located downstream the discriminating device is divided into branches corresponding in number to the denominations of the bank notes which can be discriminated by the discriminating means. A sorting gate member is provided at the inlet of each of the plurality of branch convey paths so as to selectively guide the bank note conveyed in the convey means into the inlet. A note stocker is provided at an end of each of the plurality of branch convey paths and stocks the bank note conveyed along the branch convey path. The discriminating device discriminates the denomination and authenticity of bank note conveyed along the convey path one by one and actuates the sorting gate member of a branch convey path corresponding to the discriminated denomination of the note. As a result, the note discriminated by the discriminating means is guided into a branch convey path corresponding to its denomination.

More specifically, in the bill-sorting apparatus described above, when a bundle of bank notes of different of denominations is supplied to the inlet of the convey means, the notes of different denominations are sorted in units of denominations and are stocked in the bill stockers corresponding to the denominations.

This conventional note-sorting apparatus has a plurality of optical detecting means for optically detecting a sheet conveyed in the convey means. An optical detecting means is used to detect a jamming of the notes in the convey means, and a timing of opening the isolating gate member of a branch convey path corresponding to the discriminated denomination, in order to correctly guide the bank note, immediately after being discharged from the discriminating device, to the corresponding branch convey path.

Bank note supplied to the bill-sorting apparatus absorb dust or dust attach to the bank note while these notes are ued by people. Therefore, when a large number of notes are conveyed in the convey means, they scatter much dust. Dust is also produced by an abrasion of a bank note resulting from friction between the note and the convey means. The dust attaches to the light-emitting and light-receiving portions of the optical detecting means and causes a trouble of the optical detecting means or, in the worst case, stops the optical detecting means. In order to prevent such trouble in the optical detecting means, an operator of the note-sorting apparatus periodically cleans the optical detecting means. However, in order to miniaturize the note-sorting apparatus, various types of components, including the convey means, the branch convey paths, the note-discriminating device, and the optical detecting means, all of which are described above, are arranged in the housing of apparatus at a high density. Hence, cleaning of the optical detecting means by the operator is cumbersome and requires much time.

SUMMARY OF THE INVENTION

The present invention has been made in view of the above situation and has as its object to provide a sheet processing apparatus which can easily clean an optical detecting means within a short period of time.

The object of the present invention described above can be achieved if the apparatus, which comprises convey means for conveying a plurality of supplied sheets one by one and optical detecting means for optically detecting sheets conveyed in the convey means, and performs predetermined processing while the sheets are being conveyed by the convey means, further comprises: cleaning means, provided in the sheet processing apparatus, for cleaning the optical detecting means; and cleaning actuating means, provided in the sheet processing apparatus, for actuating the cleaning means to clean the optical detecting means.

In the sheet processing apparatus having the above arrangement according to the present invention, it is preferable that the cleaning means is a cleaning pad which cleans the optical detecting means by sliding thereon, and that the cleaning actuating means comprises a lever which is reciprocal in the sheet processing apparatus, holds the cleaning pad on one end thereof, and causes the cleaning pad to clean the optical detecting means by reciprocal movement thereof. This arrangement simplifies the structure of the cleaning means and the cleaning actuating means, and ensures operation of these means.

The other end of the lever can be arranged to be operated by an operator from outside the sheet processing apparatus so that the operator can operate the lever. In this case, it is preferable that the cleaning actuating means has urging means for urging the lever to a stationary position as a position before start of reciprocal movement. Such urging means allows the operator to easily operate the lever. When this means is used, the cleaning pad must be separated from the optical detecting means when the lever is arranged at the stationary position.

The cleaning actuating means may also have urging means for urging the lever to a stationary position as a position before start of reciprocal movement and plunger/solenoid drive means for reciprocating the lever against a urging force of the urging means. This arrangement automates cleaning of the optical detecting means. This arrangement is also economical since it requires energy only when the lever is reciprocated.

The sheet processing apparatus having the above arrangement according to the present invention is further convenient if it further comprises inspecting means for inspecting the optical detecting means by utilizing shielding and non-shielding of an optical path of light emitted from the optical detecting means which occur when the cleaning pad cleans the optical detecting means, and trouble display means for displaying, among the results of inspection performed by the inspecting means, at least a trouble occurring in the optical detecting means.

DETAILED DESCRIPTION OF THE PREFERRED EMBODIMENTS

Various embodiments of the present invention will be described with reference to the accompanying drawings.

Figure 1:
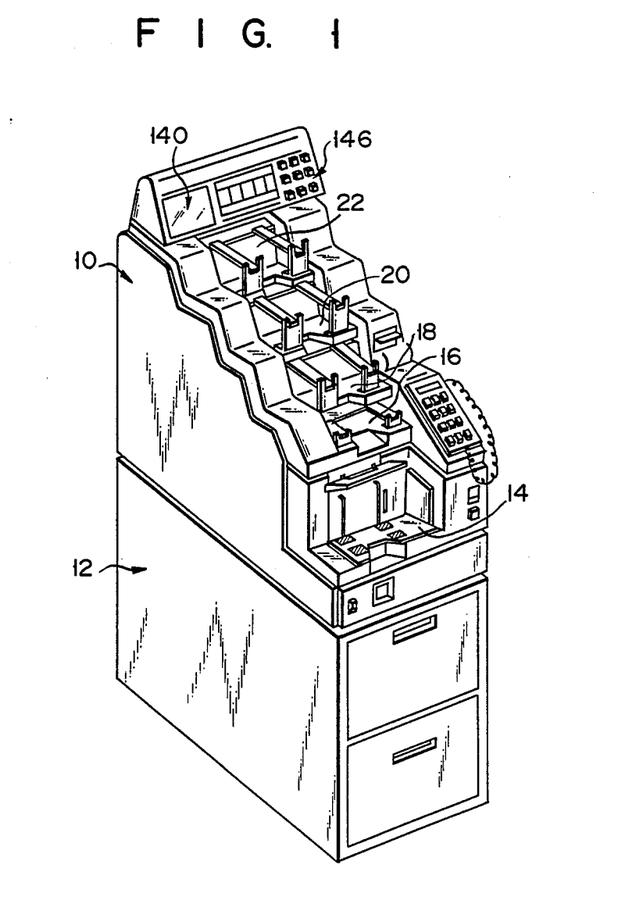
FIG. 1 is a schematic perspective view of a note-sorting/bundling apparatus constituting a sheet processing apparatus according to an embodiment of the present invention.

FIG. 1 shows an outer appearance of a note-sorting/bundling apparatus as an embodiment of the sheet processing apparatus according to the present invention. The housing of the note-sorting/bundling apparatus consists of upper and lower housings 10 and 12. Upper housing 10 stores a note-sorting device and lower housing 12 stores a note-bundling device. The upper surface of upper housing 10 is stepped, and bank note supplying portion 14, on which a bundle of bank notes of different denominations is placed, is provided on the upper surface of the lowermost step. First to fourth note-stockers 16, 18, 20, and 22 are provided on the remaining steps on the upper surface of upper housing 10 so as to stock a plurality of bank notes, sorted by the note-sorting device, in units of denominations.

Figure 2:
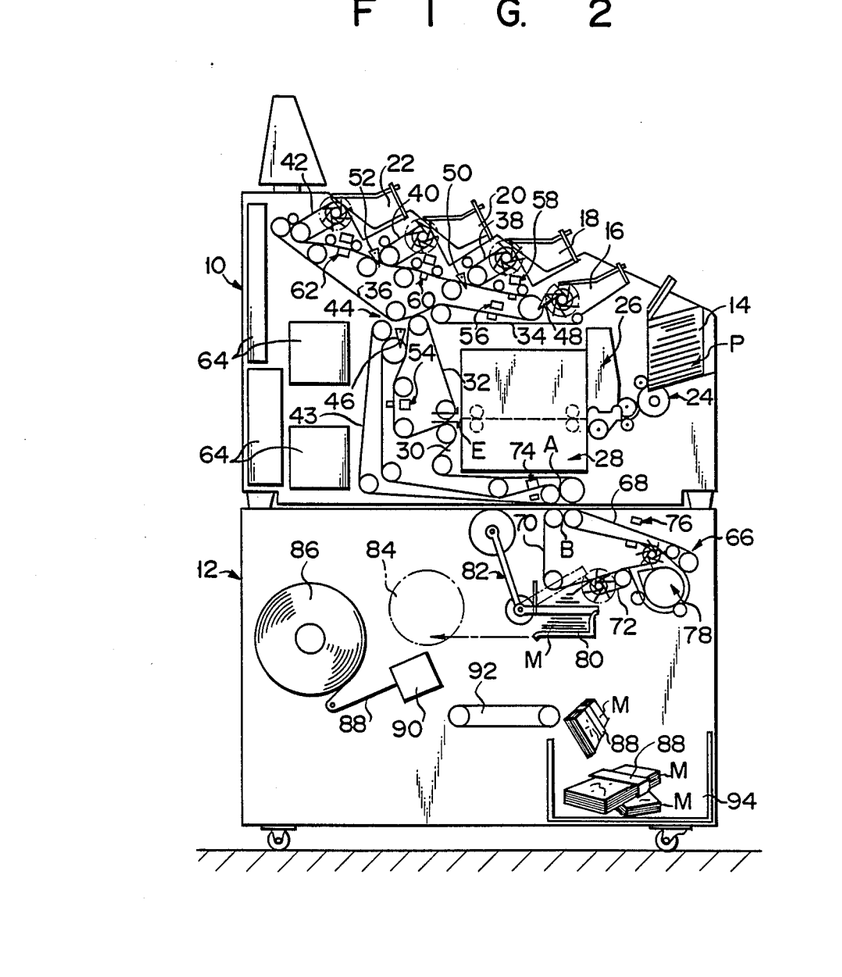
FIG. 2 is a schematic side view which shows the interior of the upper and lower housings of the note-sorting/bundling apparatus shown in FIG. 1.

FIG. 2 schematically shows the interior of upper and lower housings 10 and 12.

In the note-sorting device stored in upper housing 10, bundle P of notes of different denominations lies on note-supplying portion 14. Note take-in device 24 is arranged under supplying portion 14. Take-in device 24 takes in bank notes one by one from bundle P in supplying portion 14 and supplies each note to note-discriminating device 28 through thickness detector 26. Detector 26 detects whether two or more bank notes are taken in simultaneously by take-in device 24, and whether a foreign matter such as an adhesive cellophane tape is adhered to the single note. Take-in mechanism 24 and detector 26 constitute a convey means for conveying bank notes one by one from note-supplying portion 14 to discriminating device 28.

Discriminating device 28 discriminates the denomination (e.g., 4 denominations of ¥500, ¥1,000, ¥5,000, and ¥10,000), authenticity, and usable/unusable condition (the extent of damage) of the conveyed bank note.

Another convey means 44, constituted by a combination of a plurality of endless convey belts 30, 32, 34, 36, 38, 40, 42, and 43, and rotating rollers around which these belts are wound, is arranged at outlet E of discriminating device 28. Convey means 44 constitutes a main convey path and a plurality of branch convey paths branching from the main convey path. A note-bundling device housed in lower housing 12 and first to fourth note stockers 16, 18, 20, and 22 are located at ends of the plurality of branch convey paths and the main convey path. In this embodiment, first to fourth note stockers 16, 18, 20, and 22 stock ¥500, ¥1,000, ¥5,000, and ¥10,000 notes, respectively.

Sorting gate members 46, 48, 50, and 52 are arranged at branch points between the main convey path and the plurality of branch convey paths and selectively guide a single bank note, conveyed from the outlet E of discriminating device 28 along the main convey path, to the branch convey paths.

Optical detecting means 54, 56, 58, 60, and 62 are also arranged on the main convey path immediately before a plurality of sorting gate members 46, 48, 50, and 52 and immediately before a branch point located at the end of the main convey path.

The portions of a bank note supplied from discriminating device 28 to convey means 44 in the main convey path are detected by optical detecting means 54, 56, 58, 60, and 62. When it is detected that the note has arrived at a point immediately before the branch point of a branch convey path, into which the note is to be guided, by the optical detecting means arranged on the main convey path from outlet E of discriminating device 28 to the point in question, the sorting gate member in question is actuate to guide the note into to the corresponding branch convey path, and the note is finally guided to the note bundling device or one of first to fourth note stockers 16, 18, 20, and 22 which is located at the end of the corresponding branch convey path.

A plurality of sorting gate members 46, 48, 50, and 52 guide the bank note, supplied from discriminating device 28 to convey means 44, to a corresponding branch convey path in accordance with the discrimination result of discriminating device 28. These gate members are controlled by control means 64 connected to discriminating device 28, optical detecting means 54, 56, 58, 60, and 62, and gate members 46, 48, 50, and 52.

The note-sorting device having the above arrangement is well known and is thus not described in further detail.

The note-bundling device in lower housing 12 has convey means 66 having inlet B that opposes end A of a corresponding branch convey path of the note-sorting device.

Convey means 66 also consists of a plurality endless belts 68, 70, and 72 and a plurality of rotating rollers around which the endless belts are wound. Optical detecting means 74 and 76 are arranged at points immediately before end A of a branch convey path of the note-sorting device that corresponds to the note-bundling device and immediately after inlet B of the note-bundling device, and detect a bank note that passes on the corresponding branch convey path and convey means 66.

Convey means 66 stocks a plurality of bank notes, supplied through inlet B one by one, in stocker 80 through obverse/reverse side aligning device 78. Hence, the obverse/reverse sides of the bank notes M stocked in stocker 80 are turned in the same directions.

When the number of the bank notes stocked in stocker 80 reaches a predetermined number (e.g., 100), the predetermined number of notes M in stocker 80 are supplied to bundling position 84 by separator 82. At position 84, strip 88 supplied from strip feed reel 86 is wound around the predetermined number of notes M by strip winding device 90. The predetermined number of notes M that are bundled by strip 88 are conveyed from bundling position 84 to note bundle stocker 94 by convey means 92, and are stocked thereat.

The note bundling device having the above arrangement is also known. Particularly, separator 82 for supplying a predetermined number of notes M on stocker 80 to bundling position 84 is described in Japanese Utility Model Publication No. 53-24776.

The note-sorting/bundling apparatus having the arrangement described above in detail can arbitrarily select only notes of a predetermined denomination from the bundle supplied to the note-supplying portion 14 of the note-sorting device, and can bundle the selected bank notes of the predetermined denomination to a bundle of a predetermined number of notes by the note-bundling device.

Figure 3:
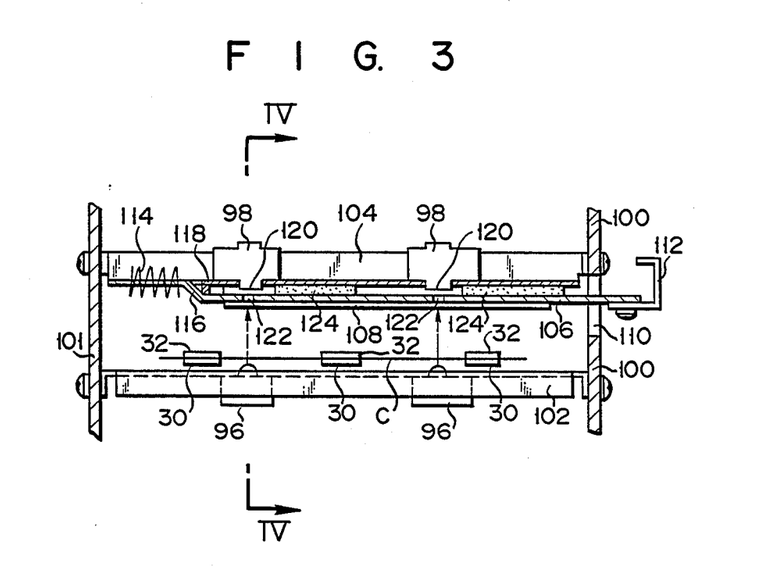
FIG. 3 is a schematic plan view showing a portion around a cleaning mechanism for an optical detecting means provided in the note-sorting/bundling apparatus shown in FIG. 1.
Figure 4:
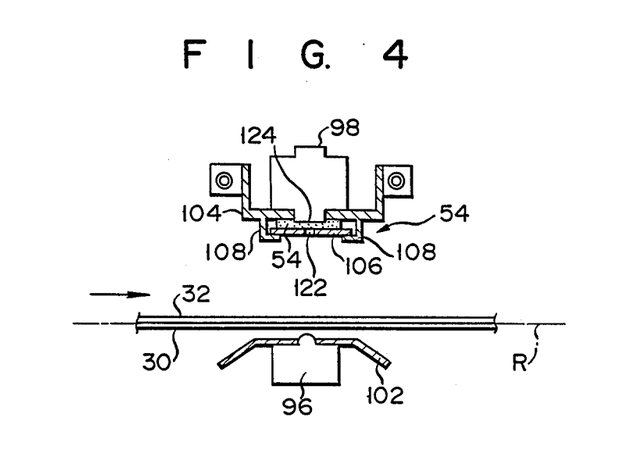
FIG. 4 is a schematic sectional view taken along the line III—III of FIG. 3.

Optical detecting means 54 used in the above note-sorting/bundling apparatus has, as shown in detail in FIGS. 3 and 4, two photocells 98 arranged in the vicinity of main convey path R constituted by two endless belts 30 and 32, and two light-emitting diodes 96 arranged at positions farther from convey path R than the photocells are. Each of two belts 30 and 32 consists of three endless belt elements. Two photocells 98 and corresponding two light-emitting diodes 96 oppose each other via gaps between the three endless belt elements of each of two belts 30 and 32. Optical detecting means 54 with the above arrangement detects a single note C conveyed along main convey path R when note C conveyed on convey path R with it being sandwiched between two belts 30 and 32 interrupts reception of light emitted from two diodes 96 by two photocells 98.

Two light-emitting diodes 96 and two corresponding photocells 98 are supported by light-emitting diode support frame 102 and photocell support frame 104 each of which have two ends supported by a pair of stationary outer frames 100 and 101 arranged to extend perpendicularly into upper housing 10.

Other optical detecting means 56, 58, 60, 62, 74, and 76 also have the same arrangements as optical detecting means 54 described above, respectively, and other endless belts 34, 46, 38, 40, 42, 43, 68, 70, and 72 also have the same arrangements as two endless belts 30 and 32 described above, respectively.

The bank notes supplied to note-supplying portion 14 of the note-sorting/bundling apparatus have been used at least once. These bank notes thus scatter dust attached to them while they are being conveyed on main convey path R at a high speed. These bank notes also produce dust by its abrasion resulting from friction between the notes and main convey path R. Since a large number of notes are supplied to note-supplying portion 14, a considerable amount of dust is scattered in upper housing 10 during the sorting of the bank notes. The dust does not attach to light-emitting diodes 96 arranged in the vicinity of convey path R because of the airflow generated when the bank notes are conveyed on convey path R at a high speed. However, since the airflow does not blow much at photocells 98, arranged at positions farther from convey path R, much dust attaches to photocells 98.

Figure 5:
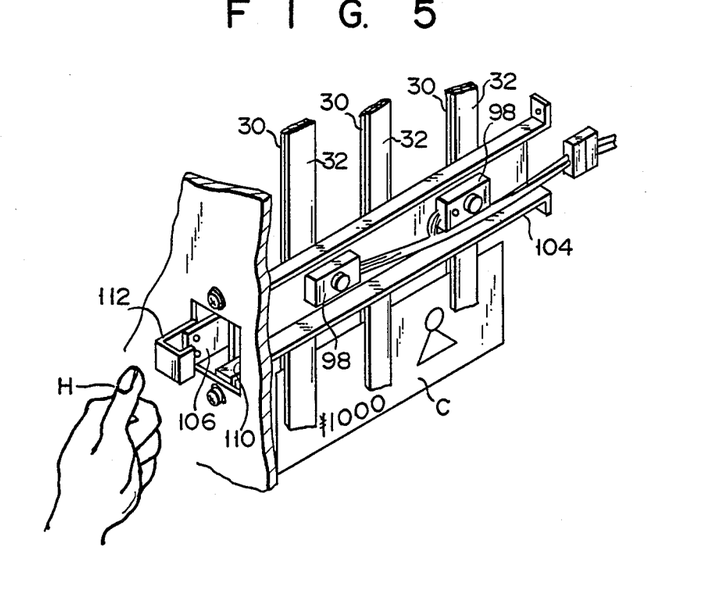
FIG. 5 is a schematic perspective view showing a state just before the depression of a finger actuating member of the cleaning mechanism, shown in FIG. 3, by a finger of an operator when the cleaning mechanism is shown from the back of a photocell support frame on the side of the finger actuating member.

Lever 106 is arranged on the surface (to be referred to as the inner surface hereinafter) of photocell support frame 104 opposing main convey path R and extends along the inner surface of frame 104. Lever 106 is supported by guide member 108, formed on frame 104, so as to be slidably reciprocated on the inner surface along the longitudinal direction of frame 104. One end of lever 106 protrudes outward from opening 110 formed in one stationary outer frame 100, and finger actuating member 112 is fixed to this outer end. The side surface of upper housing 10 corresponding to one stationary outer frame 100 is constructed by a cover which can open and close. The operator of the note-sorting/bundling apparatus can easily reach actuating member 112 at one end of lever 106, as shown in FIG. 5, with his finger H by only opening this cover.

Urging means 114, e.g., a compression coil spring, mounted on photocell support frame 104 abuts against the other end of lever 106, as shown in FIG. 3. Urging means 114 urges lever 106 so as to push out lever 106 from opening 110 in stationary outer frame 100. Lever 106 is held at the position shown in FIG. 3 against the urging force of urging means 114 since stop 118 formed on frame 104 engages with engaging projection 116 formed on the other end of lever 106. The position of lever 106 as shown in FIG. 3 is the stationary position of lever 106.

Light-transmitting holes 122 are formed in two surface regions of lever 106 corresponding to light-receiving regions 120 of two photocells 98 supported by photocell support frame 104 when lever 106 is located at the stationary position. Therefore, when lever 106 is at the stationary position, the light emitted by two light-emitting diodes 96 is received by two corresponding photocells 98 unless bank note C on main convey path R passes between two light-emitting diodes 96 and two photocells 98.

Cleaning pads 124 of, e.g., felt, are adhered on the surface of lever 106, which opposes photocell support frame 104, at the peripheral portions of two light-transmitting holes 122 on the side of the finger actuating member.

When finger actuating member 112 is depressed, lever 106 is moved from the stationary position to the left in FIG. 3 against the urging force of urging means 114, and two cleaning pads 124 slide on light-receiving regions 120 of two photocells 98. When the depressing force applied to actuating member 112 is removed, lever 106 returns by the urging force of urging means 114 to the stationary position shown in FIG. 3, and two cleaning pads 124 are separated from light-receiving regions 120 of two photocells 98.

Figure 6:
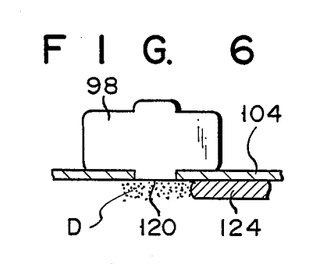
FIG. 6 is a schematic plan view showing a state wherein dust is attached to a light-receiving region of a photocell of the optical detecting means before the cleaning pad of the cleaning mechanism shown in FIG. 3 slides on the light-receiving region.
Figure 7:
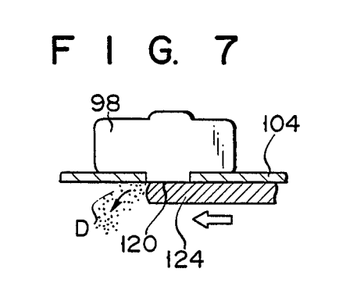
FIG. 7 is a schematic plan view, similar to FIG. 6, showing a state wherein the cleaning pad shown in FIG. 6 slides on the light-receiving region of the photocell of the optical detecting means and removes dust from the light-receiving region.

Dust D attached on light-receiving regions 120 of two photocells 98, as shown in FIG. 6, is removed from region 120 as shown in FIG. 7 when two cleaning pads 124 slide on light-receiving regions 120 of two photocells 98.

Figure 8:
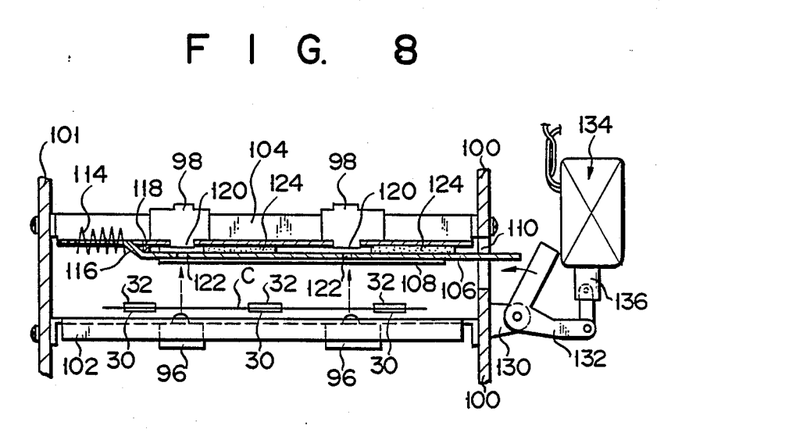
FIG. 8 is a schematic plan view showing the circumference of a modification of the cleaning mechanism for the optical detecting means provided in the note-sorting/bundling apparatus shown in FIG. 1.
Figure 9:
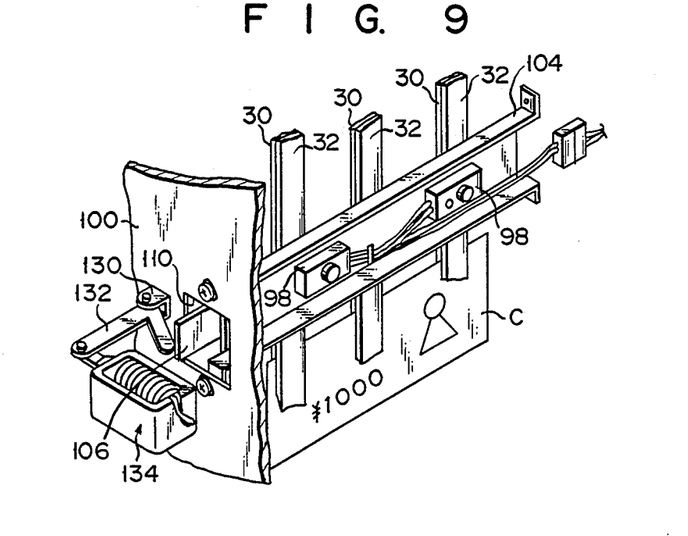
FIG. 9 is a schematic plan view showing a modification of the cleaning mechanism shown in FIG. 8 when the modification is shown from a back of the photocell support frame on the side of a plunger/solenoid drive means.

FIGS. 8 and 9 show a modification of a cleaning mechanism for the optical detecting means described above.

In this modification, no finger actuating member 112 is provided on one end of lever 106 protruding outward from opening 110 in one stationary outer frame 100. Shaft support member 130 is fixed in the vicinity of opening 110 on the outer side surface of frame 100. Support member 130 supports substantially L-shaped lever 132 to be rotatable about its center. One end of lever 132 opposes the end face of one end of lever 106, and the other end of lever 132 is pivotally coupled to plunger 136 of plunger/solenoid drive means 134 fixed to frame 100.

In the above modification, when a current is supplied to plunger/solenoid drive means 134, plunger 136 moves to rotate lever 132. Upon rotation, one end of lever 132 abuts against the end face of one end of lever 106 to urge it inward (to the left in FIG. 8) against the urging force of urging means 114. Two cleaning pads 124 on lever 106 that has moved inward slide on light-receiving regions 120 of two photocells 98 and remove the dust attached thereon.

When a current supplied to plunger/solenoid drive means 134 is cut off, lever 106 is moved outward (to the right in FIG. 8) by the urging force of urging means 114, and two cleaning pads 124 are separated from light-receiving regions 120 of two photocells 98. Outward movement of lever 106 is stopped when its engaging projection 116 is engaged with stop 118 of photocell support frame 104, as shown in FIG. 8. The position of lever 106 in this time is the same as the stationary position of lever 106 in the above embodiment.

Figure 10:
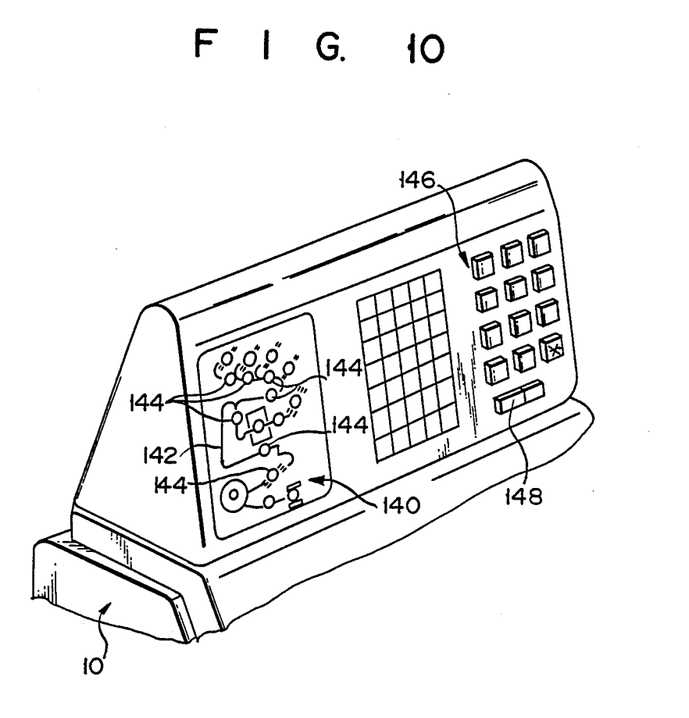
FIG. 10 is an enlarged schematic perspective view showing a trouble display means for the optical detecting means and an operation button located area that are provided on the top portion of the upper surface of the upper housing shown in FIG. 1.

The note-sorting/bundling apparatus constituting the sheet processing apparatus according to the described embodiment of the present invention has trouble display means 140 at the top portion of upper housing 10, as shown in FIGS. 1 and 10, in order to display any trouble in a plurality of optical detecting means 54, 56, 58, 60, 62, 74, and 76. Trouble display means 140 has chart 142 which is, printed on the surface of housing 10 and is, showing the main convey path and the plurality of branch convey paths in the note-sorting device and the convey paths in the note-bundling device. A plurality of light-emitting diodes 144 are arranged on chart 142 so as to designate the positions of plurality of optical detecting means in the main convey path and in the branch convey paths.

Control means 64 inspects the trouble of the plurality of optical detecting means when cleaning pads 124 clean light-receiving regions 120 of photocells 98.

More specifically, if the optical detecting means are controlled to energize light-emitting diode 96 during cleaning, the output from photocell 98 must be zero when cleaning pad 124 covers light-receiving region 120 of photocell 98. If the output is not zero despite that cleaning pad 124 covers light-receiving region 120 of photocell 98, it is determined that a trouble has occurred in photocell 98.

When cleaning pad 124 is separated from light-receiving region 120 of photocell 98, an output must be obtained from photocell 98. However, if no output is obtained under this condition, it is determined that a trouble occurs in light-emitting diode 96.

When photocell 98 is inspected, high-precision inspection can be performed if the amplification gain of photocell 98 is decreased than the normal level.

If a trouble of the optical detecting means is detected in the above manner, control means 64 energizes corresponding light-emitting diode 144 on chart 142 of trouble display means 140 and warns the trouble to the operator.

As described above, according to this embodiment, control means 64 also serves as an inspection means for the plurality of optical detecting means.

Operation button area 146 in which a plurality of operation buttons for operating the note-sorting/bundling apparatus is also provided on the top portion of upper housing 10, as shown in FIGS. 1 and 10.

When plunger/solenoid drive means 134 for driving lever 106 that performs cleaning is employed, as described above, operation button 148 for operating drive means 134 can be arranged in operation button area 146.

The above embodiment has been described for explaining the present invention. The present invention is not limited to the above embodiment but various changes and modifications can be made within the technical scope of the invention.

For example, lever 106 having cleaning pad 124 can be supported by light-emitting diode support frame 102 so as to be reciprocal along the longitudinal direction of frame 102. Lever 106 can be reciprocated relative to frame 102 so that cleaning pads 124 cleans the light-emitting region of light-emitting diode 96.

The cleaning mechanism having the arrangement as described above can be suitable to a reflection-type optical detecting means in which light-emitting and light-receiving means are integrated.

When troubles are found in a plurality of optical detecting means, control means 64 can energize light-emitting diodes 144 of trouble display means 140 corresponding to the trouble optical detecting means and stop the operation of the note-sorting/bundling apparatus. Alternatively, under the same condition, control means 64 can only energize light-emitting diodes 144 of display means 140 corresponding to the troubled optical detecting means and keep operating the note-sorting-/bundling apparatus.

What is claimed is:

1. A sheet processing apparatus including an optical sensor cleaning device, said apparatus comprising:
   conveying means for conveying a plurality of supplied sheets one by one along a path, and
   at least one optical detecting group having at least two optical detecting means arranged in a direction transverse with respect to said sheet conveying path of said conveying means, said optical detecting means optically detecting sheets conveyed in said conveying means, said sheet processing apparatus performing a predetermined processing of said sheets while said sheets are being conveyed by said conveying means, and
   cleaning means for cleaning said optical detecting means having at least one lever extending from within said sheet processing apparatus and corresponding to one of said optical detecting groups, and wiping means provided on said lever for wiping each of said optical detecting means which are contained in said optical detecting group corresponding to said lever, wherein said lever is mounted for reciprocal movement between an overlap position, in which said wiping means overlap each of said optical detecting means is the corresponding group, and a non overlap position, in which said wiping means are separated from said optical detecting means in the corresponding group, said reciprocal movement cleaning said corresponding optical detecting means by contact with said wiping means, and wehrein said lever does not interfere with an optical path of light directed towards said optical detecting means in a corresponding detecting group when said lever is in the non-overlap position.

2. An apparatus according to claim 1, wherein said wiping means comprises a cleaning pad which cleans said optical detecting means by sliding thereon.

3. An apparatus according to claim 1, wherein: the other end of said lever is mounted so as to be capable of being operated by an operator from outside said sheet processing apparatus; and said cleaning means has urging means for urging said lever to said non-overlap position 4. An apparatus according to claim 1, wherein said cleaning means has urging means for urging said lever to said non-overlap position, and plunger/solenoid drive means for driving said lever from said non-overlap position to said overlap position against the urging force of said urging means.

5. A sheet processing apparatus including an optical sensor cleaning device, said apparatus comprising:

conveying means for conveying a plurality of supplied sheets one by one along a path, and at least one optical detecting group having at least two optical detecting means arranged in a direction transverse with respect to said sheet conveying path of said conveying means, said optical detecting means optically detecting sheets conveyed in said conveying means, said sheet processing apparatus performing a predetermined processing of said sheets while said sheets are being conveyed by said conveying means, and cleaning means for cleaning said optical detecting means having at least one lever extending from within said sheet processing apparatus and corresponding to one of said optical detecting groups, and wiping means provided on said lever for wiping each of said optical detecting means which are contained in said optical detecting group corresponding to said lever, wherein said lever is mounted for reciprocal movement between an overlap position, in which said wiping means overlap each of said optical detecting means in the corresponding group, and a non-overlap position, in which said wiping means are separated from said optical detecting means in the corresponding group, said reciprocal movement cleaning said corresponding optical detecting means by contact with said wiping means, and wherein said lever does not interfere with an optical path of light directed towards said optical detecting means in a corresponding detecting group when said lever is in the non overlap position; and inspecting means for inspecting said optical detecting means, said inspecting means utilizing shielding and non-shielding of an optical path of light emitted towards said optical detecting means which occurs when said wiping means cleans said optical detecting means; and trouble display means for displaying, along with the results of inspection performed by said inspecting means, the location of a trouble occurring in one of said optical detecting means.

* * * * *